United States Patent [19]

Ng et al.

[11] Patent Number: 5,295,541
[45] Date of Patent: Mar. 22, 1994

[54] CASING REPAIR USING A PLASTIC RESIN

[75] Inventors: Ricky C. Ng, Dallas, Tex.; Thurman W. McPherson, II, Cortez, Colo.; Myung K. Hwang, Duncanville, Tex.

[73] Assignee: Mobil Oil Corporation, Fairfax, Va.

[21] Appl. No.: 994,853

[22] Filed: Dec. 22, 1992

[51] Int. Cl.⁵ .................... E21B 29/10; E21B 33/138; E21B 43/24
[52] U.S. Cl. .................... 166/277; 166/272; 166/295
[58] Field of Search .............. 166/277, 272, 295

[56] References Cited

U.S. PATENT DOCUMENTS

| | | | |
|---|---|---|---|
| 2,447,629 | 8/1948 | Beissinger et al. | 166/277 X |
| 2,495,352 | 1/1950 | Smith | 166/277 |
| 3,111,991 | 11/1963 | O'Neal | 166/277 X |
| 3,194,310 | 7/1965 | Loomis | 166/277 X |
| 3,380,528 | 4/1968 | Timmons | 166/277 |
| 3,918,521 | 11/1975 | Snavely, Jr. et al. | 166/272 |
| 4,489,783 | 12/1984 | Shu | 166/272 |

*Primary Examiner*—Stephen J. Novosad
*Attorney, Agent, or Firm*—Alexander J. McKillop; George W. Hager, Jr.; Charles A. Malone

[57] ABSTRACT

A method for replacing a damaged or corroded casing with a solid plastic is described herein. After removing the corroded or damaged casing from the wellbore, the borehole is underreamed to a desired diameter. Thereafter, a resin/curing agent mixture sufficient to form a hardened plastic or resin able to withstand downhole stresses, is placed into the wellbore so as to bind with the undamaged casing and close off any thief zone. Subsequently, the resin/curing agent mixture forms a hardened solid. The hardened solid is milled out so as to form a resinous casing the size of the original casing. Later, the hardened resinous casing is perforated to communicate with a targeted zone. Perforation is not required when isolating a zone.

28 Claims, 3 Drawing Sheets

CASING REPAIR USING A PLASTIC RESIN

FIELD OF THE INVENTION

This invention is directed to a method for the replacement of a damaged section of wellbore casing located in a subterranean formation.

BACKGROUND OF THE INVENTION

During the course of well drilling operations, a wall of a wellbore being drilled is generally sealed and stabilized by means of a protective steel casing which is lowered through a wellbore. Afterwards, the casing is cemented in place after retrieval of the drilling assembly. Setting a steel casing in a well is a time consuming and expensive procedure. Since the wellbore is essential to removing desired fluids from a subterranean formation, it is necessary that the wellbore's casing remain intact to make for a more efficient operation and avoid the loss of wellbore fluids into the formation.

Often during the production of hydrocarbonaceous fluids or other desired fluids from a formation via a wellbore, the wellbore becomes damaged or corroded. The damage may be caused by excessive pressure within the wellbore which will cause a section of wellbore casing to fail thereby interfering with its integrity. Also, wellbores which are located at levels in excess of about 5,000 ft. will often have an environment where high temperatures, high pressures, and corrosive chemicals are encountered. When these chemicals, pressures and temperatures combine, casing corrosion often occurs thereby necessitating the repair of a section of the casing so as to maintain its integrity thereby avoiding a loss of desired fluids into the formation.

Depending upon the composition of the casing which is used in the wellbore, the expense of replacing the wellbore's casing can vary. When stainless steel casings are used for example, replacement costs can be substantial. For these reasons, it is desirable to have a method for repairing the casing in the wellbore so as to maintain the efficiency of operations for removing desired fluids from the formation while at the same time minimizing the downtime and repair costs. Heretofore, it has been necessary to remove the entire wellbore casing and replace it with new casing. This of course is a time consuming and expensive operation.

Therefore, what is needed is a simple and inexpensive method of repairing a wellbore casing in situ so as to avoid loss of operational time, the production of desired fluids from the formation, or diversion of injection fluids to the oil-bearing formation.

SUMMARY OF THE INVENTION

In the practice of this invention, a section of corroded or damaged casing is removed from the wellbore. This can be achieved by various operations such as milling. Afterwards, if required, the section is further prepared with underreaming to a desired size. A drillable mechanical packer can be placed below the section of the wellbore from which the corroded or damaged casing was removed so as to allow a solidifiable mixture to fill the void created by removal of said section by containing the mixture thereabove. Subsequently, the solidifiable mixture is flowed into the voided section from which the damaged or corroded casing was removed.

The solidifiable mixture is allowed to remain in the vicinity of the wellbore from which the damage or corroded section has been removed. It remains there for a time sufficient to form a solid plastic or resin. Where a drillable mechanical packer is used a solid will be formed thereabove. The solidifiable material forms a solid in the wellbore and the voided section which previously contained the damaged or corroded casing. The solid which forms is of a composition sufficient to withstand environmental conditions encountered at the wellbore depth from which the damage or corroded section of wellbore casing was removed. This solid also forms a bond with the undamaged or corroded casing so as to prevent liquid or gaseous fluids from flowing therethrough.

Subsequently, solid material within the wellbore is removed, preferably by drilling so as to establish communication with the formation and the surface via the wellbore. Where a mechanical packer is utilized it too is drilled out. Once excess solid material has been removed from the wellbore, the remaining solid material reestablishes the integrity of the wellbore casing. The wellbore is now of a diameter substantially similar to the casing prior to its being repaired.

The solidifiable material which is used herein is comprised of a resin/curing agent material which hardens in situ to form a solid plastic material. Any solid which is formed via said material should be of a composition sufficient to withstand environmental conditions, pressures, and temperatures located at the depth where the damage or corrosion occurs.

It is therefore an object of this invention to replace a damaged or corroded wellbore casing by use of materials in situ so as to avoid removing the steel casing from the wellbore.

It is another object of this invention to provide for a simple, safe, economical, and effective means of repairing or replacing a damaged or corroded section of a wellbore in situ.

It is yet another object of this invention to provide for a wellbore casing replacement material, which is equal to or better in composition than the original casing so as to withstand environmental conditions encountered within the wellbore, particularly deep wellbores.

BRIEF DESCRIPTION OF THE PREFERRED EMBODIMENTS

Figure 1:
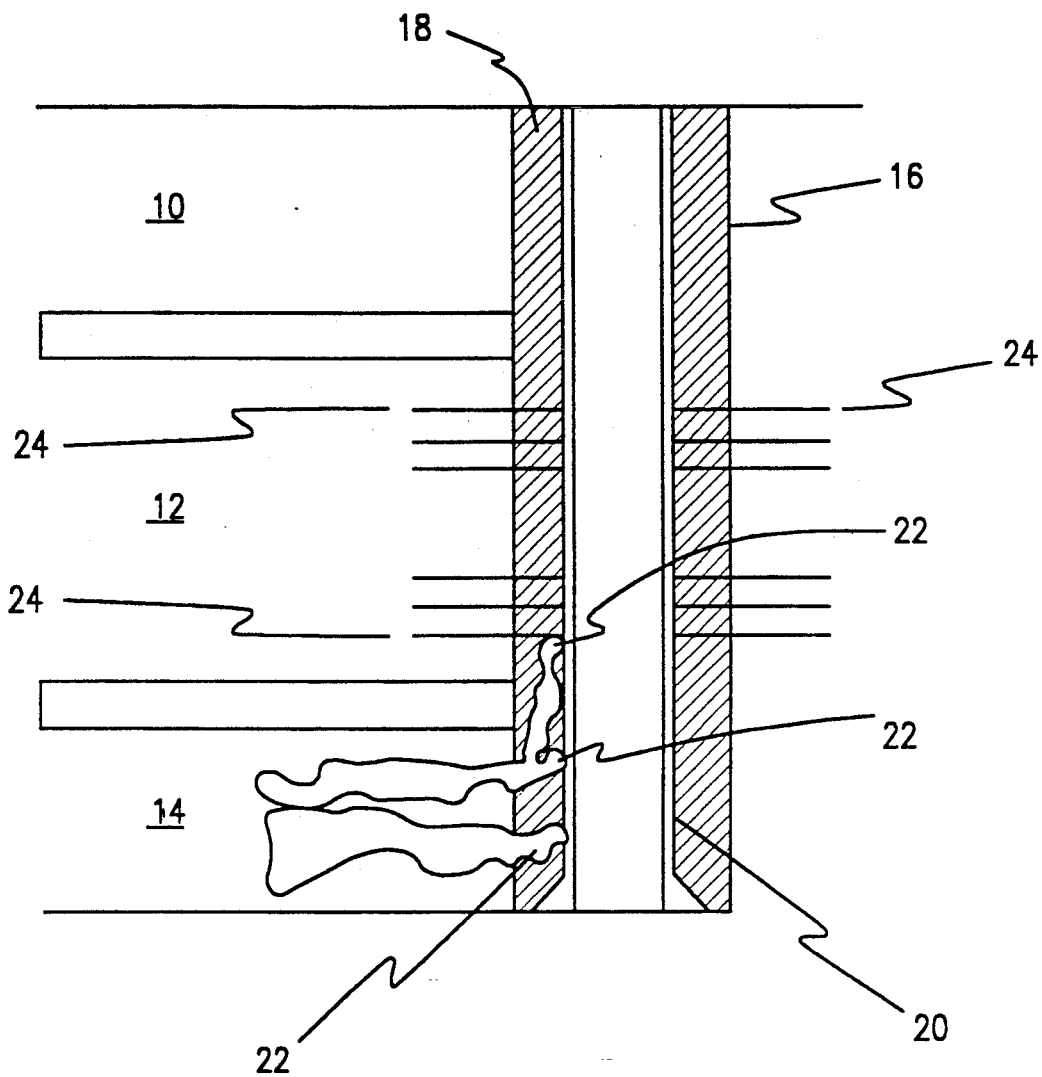
FIG. 1. is a schematic representation of a cased wellbore where channels have been made in the casing thereby communicating the wellbore with a thief zone.

As is shown in FIG. 1, a wellbore penetrates formation 10, producing zone 12, and thief zone 14. The borehole contains cement 18 and casing 20. During the removal of hydrocarbonaceous or other desired fluids from the formation, conditions existing at the lower portion of the wellbore have caused casing 20 to be damaged by channels 22. These channels 22 allow fluids to move from the wellbore into a thief zone 14. Ordinarily, it would be necessary to remove the entire casing 20 and replace it with a new casing.

Figure 2:
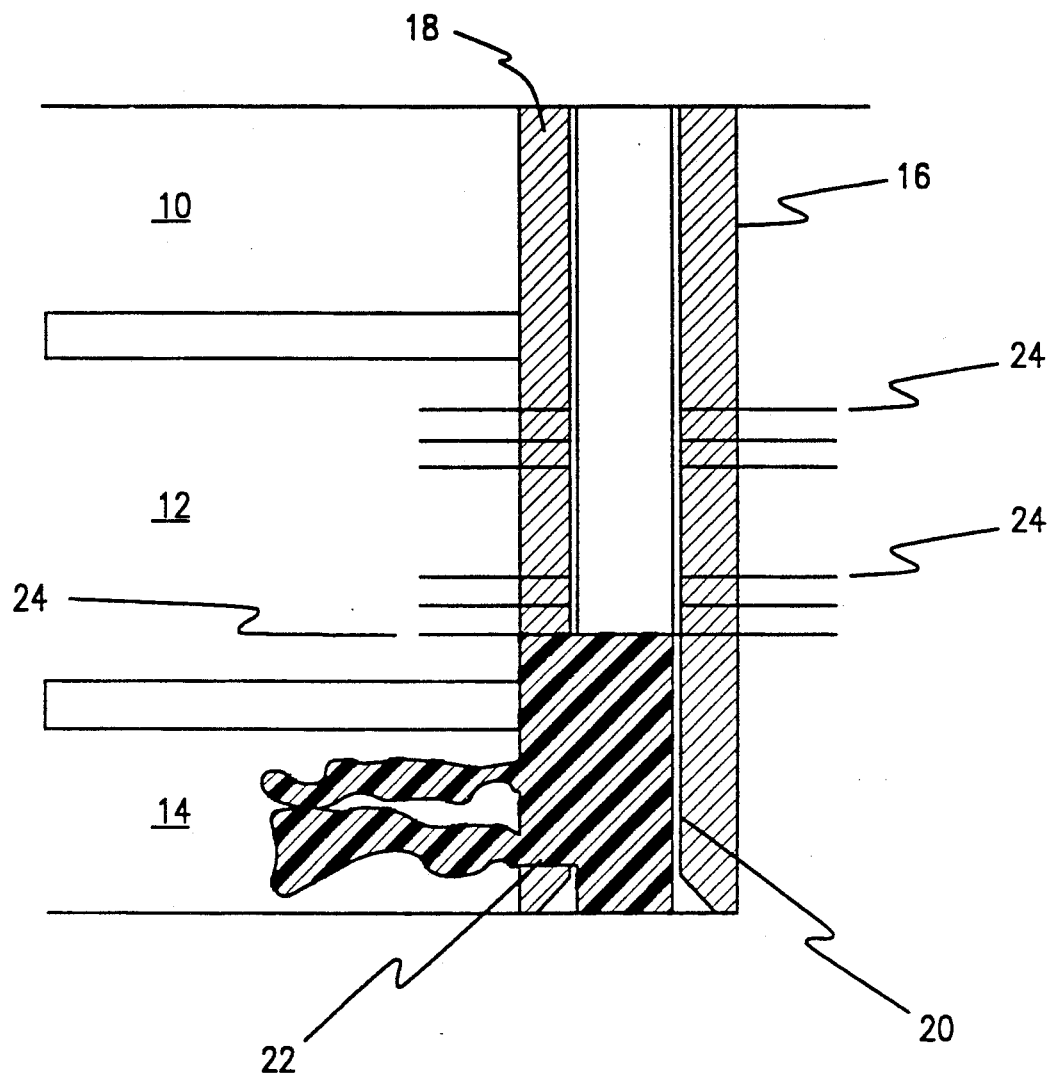
FIG. 2. is a schematic representation which details the formation of a solid plastic in the wellbore and also in the area of the wellbore where the casing has been removed and underreamed. Additionally, it shows the solid plastic in a thief zone which communicated previously with the wellbore.

In the practice of this invention, as is shown in FIG. 2, a portion of casing 20 that contains channels 22 which communicate with thief zone 14 has been removed. After removing the damaged casing containing channels 22, borehole 16 is underreamed to a desired size at a location just below perforations 24 above channels 22. Thereafter, a solidifiable mixture is flowed into casing 20 whereupon it also penetrates via channels 22 into thief zone 14. The solidifiable mixture is allowed to remain in the wellbore and thief zone 14 so as to form a thick solid wall which is able to withstand environmental conditions encountered at a preferred depth in formation 10. After the solidifiable mixture has formed a solid, a drilling operation is conducted within the wellbore to remove excess solid material from the wellbore. The underreaming provides the desired thickness of the plastic casing to withstand the downhole stress.

Once the solid material is removed from the wellbore, the casing is comprised of the remaining solid plastic material that abuts the metal casing which was already in the wellbore. Any solidifiable material which flowed into thief zone 14 remains therein as a solid. The completed wellbore casing containing the repaired section comprised of the solid material is shown in FIG. 3.

Figure 3:
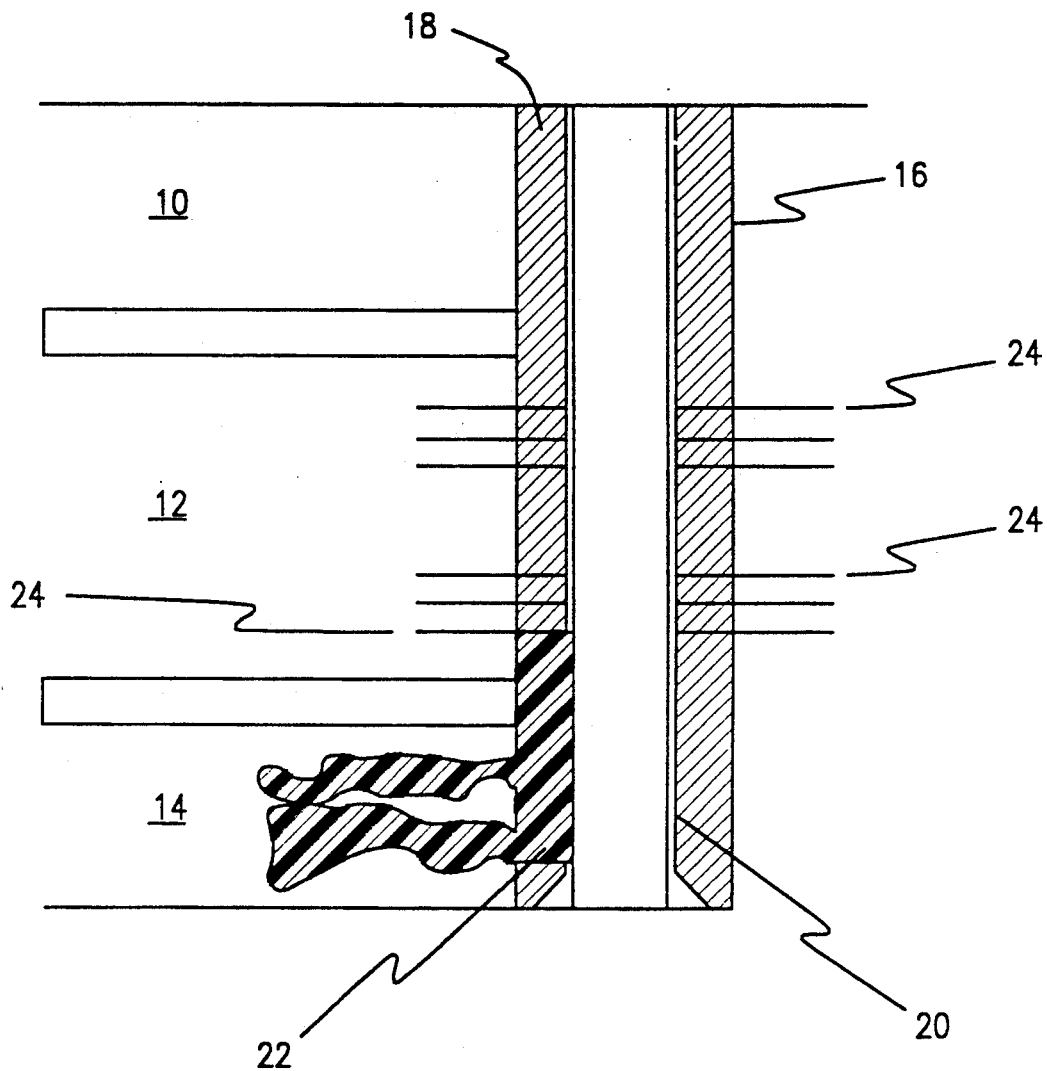
FIG. 3 is a schematic representation which shows replacement of the damaged or corroded casing and cement behind the casing by the solid plastic after removing excess solid material from the wellbore.

In those situations where it is desired to repair a damaged or corroded section of casing 20 at a level higher than the bottom of the wellbore as is shown in FIGS. 1, 2, and 3 a drillable mechanical packer can be placed below the portion of the casing which it is desired to repair or replace. Once the drillable packer has been positioned as desired in the wellbore, the solidifiable mixture is flowed into the wellbore and is placed on the drillable packer whereupon it flows into channels which communicate with a thief zone or other zone of the formation. Subsequently, the solidifiable mixture will form a solid plastic which is subsequently drilled out along with the drillable packer. Once this has been done, the well can be produced as desired.

The solidifiable material can comprise a resinous material.

One method for placing the resinous material into the formation is by use of a positive displacement dump bailer. This is a mechanical device, symmetrical in shape, which is filled with a mixture of resinous material and an acid or alkaline curing agent. It is lowered into the wellbore by a cable. The bailer is positioned at the desired depth above the damaged casing or packer and when activated, releases a metal bar in the top of the device. The bar falls downward inside the device and impacts the top of the fluid creating a downward-moving shock wave which travels through the fluid column contained in the bailer. The shock wave causes a shearing of metal pins in the bottom of the bailer and a subsequent downward movement of the small piston. This small piston uncovers ports to allow a release of the resinous material. The bar continues to fall through the bailer as fluid is released through the ports. The weight of the metal bar effectively adds to the weight of the fluid column being dumped. As the bar falls to the bottom of the bailer, the cylindrical bailer is wiped clean of the resinous material containing an acid or alkaline curing agent.

Other types of positive displacement dump bailers, which operate in a similar manner, may also be used. It is possible to deliver the resinous viscous material with curing agent therein in an open gravity-feed dump bailer. This is a bailer which is open at the top and closed at the bottom. When activated, the bottom cover, which is held by metal pins, is sheared by an explosive or by other means so as to open the bottom. Opening the bottom allows the resinous viscous material with curing agent therein to flow by gravity from the bottom of the bailer and into the damaged casing area and thief zone 14.

A coiled tubing may also be used to place the viscous resinous material at the site from which the damaged casing has been removed. The coiled tubing consists of a one-inch or other small pipe which is wound on a spool at the surface of borehole 16. The viscous resinous material and curing agent therein are placed in the end of the tubing and held in place by wiper balls at the top and at the bottom of the resinous material. The tubing is then uncoiled and lowered into the wellbore above the site where it is desired to replace the casing. Thereafter, the viscous resinous material with curing agent therein is pressured through the tubing and released into the wellbore where it flows into the thief zone via channels 22 and contacts casing 20. Here it forms a solid in the wellbore 16 and thief zone 14. As is shown in FIG. 2, the resinous material enters thief zone 14 via channels 22. Because the resinous material with curing agent therein is fast acting, a solid 22 is formed in the wellbore and thief zone 14. This material, of course, can be held in place by a drillable packer if required. The material is allowed to harden in thief zone 14 and the wellbore.

The preferred resin for use herein comprises an epoxy resin, a curing agent, a reactive diluent, and a filler. An example of epoxy resin is Shell's EPON-828®, a bisphenol-A epichlorohydrin epoxy resin with an epoxide equivalent weight of 185-192. Another epoxy resin is Shell's EPON DPL-862®, a bisphenol-F epichlorohydrin epoxy resin with an epoxide equivalent weight of 166-177. The epoxy resin is blended with a reactive diluent and a filler. An example of the reactive diluent is Scherling Berlin's Diluent 7, a monofunctional glycidyl ether based on alkyl groups of $C_8$-$C_{10}$. The diluent is used to increase pot life or gel time of the epoxy resin and to increase load capacity for the filler. In some cases, a large amount of filler (up to 50% by weight relative to the epoxy resin) is added to the resin mixture. It serves to increase the specific gravity of the resin mixture for gravity dump-bailing applications and for application in deep wells. The filler is also used as a heat sink to allow more working time. An example of the filler is a fine powder of calcium carbonate or silica flour. A crosslinking or curing agent is then added to the resin mixture. This makes a fast-reacting gel which hardens in a short period of time.

An example of a curing agent is Schering Berlin's Euredur[200] 3123, a polyamide epoxy curing agent. For fast curing at or below room temperature, Schering Berlin's Euredur 3254 can be used. Euredur 3254 is a Mannich base aliphatic polyamine attached to a phenol group. A catalytic tertiary amine can also be blended with the aforementioned curing agents to promote even faster curing. For high temperature applications, an anhydride such as Ashland Chemicals' phthalic anhydride or a liquid anhydride of methyl tetrahydrophthalic anhydride can be used. The concentration and volume of curing agent utilized must be customized according to the temperature of the well right before the dump-bailing operation. This allows the resin to have about twenty minutes of flow time and to gel in about 60 minutes. The amount of various batches of the resinous material to be utilized depends on the hole size to be filled. The resin plugs the bottom of thief zone 14 and binds with the undamaged portion of casing 20.

The resinous or solid plastic which forms should have a fracture toughness able to withstand perforations being placed therein so as to remove fluids from a producing zone. In addition to forming a solid liner, the resinous material or plastic should be able to preclude formation gases and liquids from flowing therethrough.

As mentioned above, in order to thin the epoxy resin thus increasing the pot life, a five to fifteen weight percent solution of a reactive diluent is utilized. Use of this concentration of diluent allows for efficient draining of the dump-bailer or for speeding up resin penetration into any cracks or channels behind the casing. It has also been determined that it is best to use a resin which is substantially fresh. Freshness can be determined by a measurement of the resinous material's viscosity. If the viscosity is over a recommended tolerance limit, it should be rejected. The preferred viscosity range is about 4,000 to 11,000 centipoise @75° F. A simple, rugged capillary viscometer is available to measure the viscosity obtained. This viscometer can be obtained from Baxter Scientific Products.

Where desired, a steam-flooding, $CO_2$-flooding, or water-flooding process can be initiated in either producing zone 20 or thief zone 14 of the formation. Steam-flooding processes which can be used when employing the procedure described herein are detailed in U.S. Pat. Nos. 4,489,783 and 3,918,521 which issued to Shu and Snavely, respectively. These patents are hereby incorporated by reference herein. Of course, the viscous material which is utilized, must be capable of withstanding steam temperatures.

Although the present invention has been described with preferred embodiments, it is to be understood that modifications and variations may be resorted to without departing from the spirit and scope of this invention as those skilled in the art will readily understand. Such modifications and variations are considered to be within the purview and scope of the appended claims.

What is claimed is:

1. A method for replacing a damaged or corroded wellbore casing located within a borehole comprising:
   a) removing a damaged or corroded casing section from the wellbore thereby making a damage or corrosion free site;
   b) making the borehole to a desired size at the site from which said section has been removed;
   c) placing a mechanical packer below the section from which damage or corrosion has been removed in a manner sufficient to allow a solidifiable mixture to fill a space previously occupied by said section;
   d) flowing the solidifiable mixture into said space until the space and wellbore adjacent thereto are filled with the mixture;
   e) allowing the mixture to remain in said space and wellbore for a time sufficient to form a solid able to withstand environmental conditions at said site while precluding fluid flow therethrough; and
   f) removing excess solid material from the wellbore so as to form a solid wall bonded to and having a diameter substantially similar to said casing.

2. The method as recited in claim 1 where in step a) the damaged or corroded section is removed by milling.

3. The method as recited in claim 1 where in step b) the borehole is restored to its original size by under-reaming.

4. The method as recited in claim 1 where in step c) the solidifiable mixture comprises a resin, a catalyst or curing agent, a diluent, and a filler.

5. The method as recited in claim 1 where in step d) the solidifiable mixture is flowed into the space and wellbore adjacent thereto by a positive displacement dump-bailer.

6. The method as recited in claim 1 where said solidifiable mixture is flowed into the space and wellbore adjacent thereto by a coiled tubing.

7. The method as recited in claim 1 where in step e) the solid which is formed has a fracture toughness able to withstand perforations being placed therein.

8. The method as recited in claim 1 where in step e) the solid is able to preclude formation gases and liquids from flowing therethrough.

9. The method as recited in claim 1 where in step f) the solid wall forms a liner with the undamaged or uncorroded casing.

10. A met hod for replacing a damaged or corroded wellbore casing located within a borehole comprising:
    a) removing a damaged or corroded casing section from the wellbore thereby making a damage or corrosion free site;
    b) making the borehole a desired size at the site from which said section has been removed;
    c) flowing a solidifiable mixture into said wellbore and site until the site and wellbore adjacent thereto are filled with the mixture;
    d) allowing the mixture to remain in said site and wellbore for a time sufficient to form a thick solid casing able to withstand environmental conditions at said site while precluding fluid flow therethrough; and
    e) removing excess solid material from the wellbore so as to form a solid wall bonded to and having a diameter substantially similar to said casing.

11. The method as recited in claim 10 where in step a) the damaged or corroded section is removed by milling.

12. The method as recited in claim 10 where in step b) the borehole is made a desired size by underreaming to ensure a necessary thickness of solid casing repair material.

13. The method as recited in claim 10 where in step c) the solidifiable mixture comprises a resin and catalyst mixture.

14. The method as recited in claim 10 where in step c) the solidifiable mixture is flowed into the space and wellbore adjacent thereto by a positive displacement dump-bailer.

15. The method as recited in claim 10 where said solidifiable mixture is flowed into the space and wellbore adjacent thereto by a coiled tubing.

16. The method as recited in claim 10 where in step d) the solid which is formed has a fracture toughness able to withstand perforations being placed therein.

17. The method as recited in claim 10 where in step d) the solid is able to preclude formation gases and liquids from flowing therethrough.

18. The method as recited in claim 10 where in step e) the solid wall forms a liner with the undamaged or uncorroded casing.

19. The method as recited in claim 10 where after step b) a drillable mechanical packer is placed in the wellbore before flowing the solidifiable mixture into a desired site.

20. The method as recited in claim 10 where in step c) the solidifiable mixture contains an epoxy resin.

21. The method as recited in claim 10 where in step c) the solidifiable mixture contains a bisphenol-A epichlorohydrin epoxy resin with an epoxide equivalent weight of about 185 to about 192.

22. The method as recited in claim 10 where in step c) the solidifiable mixture contains a bisphenol-F epichlorohydrin epoxy resin with an epoxide equivalent weight of about 166 to about 177.

23. The method as recited in claim 10 where in step c) the solidifiable mixture contains a bisphenol-A epichlorohydrin epoxy resin, a monofunctional glycidyl ether comprised of $C_8$–$C_{10}$ alkyl groups, and a polyamine epoxy curing agent.

24. The method as recited in claim 10 where in step c) the solidifiable mixture comprises a bisphenol-F epichlorohydrin epoxy resin, a monofunctional glycidyl ether comprised of $C_8$–$C_{10}$ alkyl groups, a polyamine epoxy curing agent.

25. The method as recited in claim 10 where in step c) the solidifiable mixture comprises a bisphenol-A epichlorohydrin epoxy resin, a monofunctional glycidyl ether comprised of $C_8$–$C_{10}$ alkyl groups, a polyamine epoxy curing agent, and a filler.

26. The method as recited in claim 10 where in step c) the solidifiable mixture comprises a bisphenol-F epichlorohydrin epoxy resin, a monofunctional glycidyl ether comprised of $C_8$–$C_{10}$ alkyl groups, a polyamine epoxy curing agent, and a filler.

27. The method as recited in claim 10 where in step c) the solidifiable mixture comprises a bisphenol-A epichlorohydrin epoxy resin, a monofunctional glycidyl ether comprised of $C_8$–$C_{10}$ alkyl groups, a Mannich base aliphalic polyamine attached to a phenol curing agent, and a filler.

28. The method as recited in claim 10 where in step c) the solidifiable mixture comprises a bisphenol-F epichlorohydrin epoxy resin, a monofunctional glycidyl ether comprised of $C_8$–$C_{10}$ alkyl groups, a Mannich base aliphalic polyamine attached to a phenol curing agent, and a filler.

* * * * *